Patented May 18, 1926.

1,585,211

UNITED STATES PATENT OFFICE.

CHARLES E. RUDD, OF ASHEVILLE, NORTH CAROLINA.

TANNING LIQUOR.

No Drawing. Continuation of application filed March 29, 1922, Serial No. 547,822. This application filed August 25, 1925. Serial No. 52,469.

My invention relates to improvements in tanning liquors, and has for its object the providing of a tanning liquor which can be easily prepared, will be cheap and will obtain quick results when used on heavy hides. I have found that if certain of the commercial tanning extracts now known are blended together in certain proportions and a certain amount of alkali added to the mixture, a superior tanning liquor is formed which has the properties referred to. I do not claim as new the use of an alkali in tanning extracts or liquors, but my invention lies in the novel combinations and compositions which I hereinafter describe and claim.

The present application is a continuation of my co-pending application Serial Number 547,822.

I have found that the best results in preparing my tanning liquor are obtained by mixing together, thoroughly and slowly, 7560 pounds of liquid spruce extract and 11340 pounds of quebracho extract. When this composition has been thoroughly mixed I add 170 pounds of light soda ash (known as 58% soda ash light), which I have previously dissolved in 680 pounds of warm water. The whole mixture should then stand for two or three days, until effervescence stops. The tanning liquor is then ready for the market or for use. It can be seen, therefore, that it is a liquor which is very easily prepared by the tanner and with the elimination of a great deal of detail usually present in the preparation of such liquors. I have found that this preparation obtains very quick results on hides, particularly on heavy hides. It is not necessary to use the exact amounts given in the above formula, and I have found that an extract of nearly the same properties is secured where the proportion of spruce extract runs from 50% to 30% combined with quebracho extract of from 50% to 70%. The soda alkali should be added preferably at the rate of 3 lbs. for each 100 lbs. of dry tannin contained in the spruce and quebracho extracts. It is to be understood, however, that I do not limit myself to these particular proportions, but the scope of the invention is as set forth in the claims appended hereto. The spruce extract contains about 25% dry tannin, while the quebracho extract contains 35% of dry tannin. Therefore, for example, in a mixture of 100 lbs. of spruce extract and 100 lbs. of quebracho extract, the spruce contains 25 lbs. of dry tannin and the quebracho 35 lbs., making a total of 60 lbs. of dry tannin. At the rate of 3 lbs. of soda for each 100 lbs. of dry tannin under my formula, about 1.8 lbs. of soda preferably should be added to the mixture. If, on the other hand, 60 lbs. of liquid spruce extract (30%) is used and 140 lbs. of quebracho (70%), the dry tannin content of the spruce extract is 15 lbs. and the dry tannin in the quebracho extract is 49 lbs. Based upon the rate of 3 lbs. for each 100 lbs. of dry tannin, about 1.92 pounds of soda should then be added. I have found that this rate of adding 3 lbs. of soda for each 100 lbs. of dry tannin content in the extracts works as a practicable rule and produces the most satisfactory results.

A combination of chestnut extract and quebracho extract will produce a resulting leather with practically the same properties, as the leather produced with the tannin extract described in the preceding paragraph. If a chestnut extract is used, the proportion of such extract preferably should be within the range of 65% to 45%, with the proportion of quebracho extract from 35% to 55%. The chestnut extract contains the same percentage of dry tannin as the spruce extract, namely, 25 lbs. per 100 lbs. of extract. In using the combination of chestnut extract and quebracho extract, the soda should be added as before, namely, about 3 lbs. per 100 lbs. of dry tannin. Combination of other tanning extracts can be used in like manner, namely, such as oak bark extract, hemlock, wattle, gambier, and other commercial extracts. Such combinations will produce leather of nearly the same properties. Variations in the blending produce somewhat differently colored leathers, which may be arranged for as desired.

As described above, the dry tannin content can be ascertained, and in order to get the full benefits of my invention, soda should be added to the blend of tannin liquor at about 3 pounds per 100 pounds of dry tannin. However, leather can be produced wherein the amount of soda added may vary considerably from the figures given. I do not intend to limit myself to the particular amount of soda to be added, as described in connection with my preferred composition. The alkali to be added may vary from 2 to 40 pounds for each 100 pounds of dry tannin, but preferably should be around 3 lbs.

The following specific proportions have also been used, and are found to give satisfactory results: 2–4 lbs. of alkali per 100 lbs. dry tannin, 2–12 lbs. of alkali per 100 lbs. dry tannin, 2–20 lbs. of alkali per 100 lbs. dry tannin.

What I claim as new and desire to secure by Letters Patent is:—

1. A tanning liquor composed of a blend of tanning extracts with the addition of an alkaline compound of an alkali metal in the proportions of approximately 3 lbs. of said compound to each 100 lbs. of tannin content contained in said blend.

2. A tanning liquor composed of a blend of tanning extracts with the addition of from 2 lbs. to 4 lbs. of soda ash for each 100 lbs. of tannin content contained in said blend.

3. A tanning liquor composed of a blend of tanning extract and an equal or larger amount of quebracho extract with the addition of from 2 lbs. to 4 lbs. of soda ash for each 100 lbs. of tannin content contained in said blend.

4. A tanning liquor composed of a blend of from 50 per cent to 30 per cent of tanning extracts with from 50 per cent to 70 per cent of quebracho extract with the addition of from 2 to 4 lbs. of soda ash for each 100 lbs. of tannin content contained in said blend.

5. A tanning liquor composed of a blend of from 50 per cent to 30 per cent of spruce extract with from 50 per cent to 70 per cent of quebracho extract with the addition of from 2 to 4 lbs. of soda ash for each 100 lbs. of tannin content contained in said blend.

6. A tanning liquor of substantially the following composition: blend of liquid spruce extract—7560 lbs., and quebracho extract—11,340 lbs., and the addition of 170 lbs. of light soda ash.

7. The method of preparing a tanning liquor by blending together extracts containing tannin and adding to such mixture from 2 to 4 lbs. of soda ash for each 100 lbs. of tannin content in said extracts.

8. The method of preparing a tanning liquor by blending together from 50 per cent to 30 per cent of spruce extract with 50 per cent to 70 per cent of quebracho extract and adding to such mixture from 2 to 4 lbs. of soda ash for each 100 lbs. of tannin content contained in said extracts.

9. A tanning liquor composed of a blend of tanning extracts and an alkaline compound of alkali metal in the proportion of from 2 to 40 pounds of said compound for each hundred pounds of tannin content contained in the said blend.

10. A tanning liquor composed of a blend of a tanning extract combined with quebracho extract of an amount at least equal to that of the tanning extract and from 2 to 40 lbs. of an alkaline compound of an alkali metal for each 100 lbs. of tannin content contained in the said blend.

11. A tanning liquor composed of a blend of a tanning extract and a quebracho extract, and from 2 to 20 pounds of soda ash for each hundred pounds of tannin content contained in said blend.

12. The method of preparing a tanning liquor by blending together extracts containing tannin and adding to such mixture from 2 to 40 pounds of an alkaline compound of an alkali metal for each hundred pounds of tannin content in said extract.

13. The method of preparing a tanning liquor by blending together extracts containing tannin and adding to such mixture from 2 to 20 pounds of soda ash for each hundred pounds of tannin content in said extract.

14. The method of preparing a tanning liquor by blending together spruce extract with quebracho extract and adding to such mixture from 2 to 40 pounds of an alkaline compound of an alkali metal for each hundred pounds of tannin content contained in said extract.

15. The tanning liquor composed of a blend of tanning extract and alkali in the proportion of from 2 to 12 pounds of an alkaline compound of an alkali metal for each 100 lbs. of tannin content contained in the said blend.

16. The method of preparing a tanning liquor by blending together extracts containing tannin and adding to such mixture 2 to 12 pounds of soda ash for each 100 pounds of tanning content in said extract.

In testimony whereof, I have signed my name to this specification.

CHARLES E. RUDD.